Patented Feb. 9, 1926.

1,571,970

UNITED STATES PATENT OFFICE.

HOWARD SANDERSON, OF BALDWIN, NEW YORK, ASSIGNOR TO EMANUEL DAVID, OF NEW YORK, N. Y.

FERTILIZER.

No Drawing. Application filed January 24, 1924. Serial No. 688,291.

*To all whom it may concern:*

Be it known that I, HOWARD SANDERSON, a citizen of the United States, and resident of Baldwin, in the county of Nassau and State of New York, have invented certain new and useful Improvements in Fertilizers, of which the following is a specification.

My invention relates to fertilizers for promoting the growth of plants and particularly of grass, and has been devised especially for the purpose of obtaining a vigorous and uniform sward of fine appearance and good resisting power, such as is eminently desirable on golf links. Of course, lawns, gardens, parks, and the like will be equally benefited by my invention. An important feature of my improvement is the advantage of great economy which results from the use, as a raw material for preparing the new fertilizer, of a substance which is now considered a waste product and may therefore be obtained at a comparatively low cost.

This raw material consists of the shell of cacao beans, which shell, in the nature of a flaky body somewhat similar to the inner or thin shell of almonds or of peanuts, is obtained as waste or "chaff" in the treatment of cacao beans for the manufacture of cocoa, chocolate, and similar products. I have ascertained that this thin inner shell of the cacao bean contains substances or compounds which have a great and unexpected value as fertilizing agents. The presence of theobromine in the shell of the cacao bean has been known for some time, but the fertilizing properties of this material, particularly in the comminuted form in which I prefer to employ it, have not been discovered and utilized hitherto.

In carrying out my invention, I take the broken or flaky shells obtained as a waste product in the step of shelling cacao beans, and comminute or grind these flakes or pieces of shell in a mill or other suitable contrivance. Grinding to a fineness corresponding to that usually obtained when grinding coffee will give good results, but I do not wish to limit myself to this. The ground shells may be used alone, or mixed with dried humus, sand, lime, loam, or other materials. These materials may be mixed either with the ground cacao bean shells, or with the flaky shells before grinding, in which latter case the ingredients of the mixture are ground together, which in some instances will assist in obtaining a more efficient comminution of the cacao bean shell by attrition when in contact with the added material. A mixture of two parts (by weight) of cacao bean shell with one part of loam has been found satisfactory, loam itself, like the humus, sand, and lime mentioned above, having growth-promoting properties, but other mixtures may be employed, or the cacao bean shell may be used alone.

The product thus obtained, in a comminuted or powdery form, is readily spread on the ground. It has a brown or slightly reddish brown color and thus blends better with the color of the soil than most fertilizers now in use, and may therefore be applied repeatedly without attracting attention unduly and impairing, by a too contrasting color, the appearance of lawns, golf links, etc. Its fertilizing properties are truly remarkable, and it is active at all times of the year and will keep the grass or other plants in good condition even when they are trod upon frequently.

Various modifications may be made without departing from the nature of my invention as set forth in the appended claims.

I claim:

1. A fertilizer embodying the shells of cacao beans in comminuted form.

2. A fertilizer embodying the shells of cacao beans in comminuted form, mixed with other growth-promoting material likewise in comminuted form.

In testimony whereof I have hereunto set my hand.

HOWARD SANDERSON.